United States Patent
Mcdonald et al.

(10) Patent No.: US 12,393,284 B2
(45) Date of Patent: Aug. 19, 2025

(54) DEVICE ORIENTATION DETECTION

(71) Applicant: Nokia Technologies Oy, Espoo (FI)

(72) Inventors: Rory Andrew Bruce Mcdonald, Cambridge (GB); Christopher John Wright, London (GB); Harry Michael Cronin, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/241,330

(22) Filed: Sep. 1, 2023

(65) Prior Publication Data
US 2024/0077953 A1 Mar. 7, 2024

(30) Foreign Application Priority Data
Sep. 6, 2022 (EP) .................. 22194241

(51) Int. Cl.
| | |
|---|---|
| G06F 3/03 | (2006.01) |
| G06F 3/01 | (2006.01) |
| G06T 7/60 | (2017.01) |
| G06T 7/70 | (2017.01) |
| G06T 11/00 | (2006.01) |
| G06T 19/00 | (2011.01) |

(52) U.S. Cl.
CPC .............. G06F 3/03 (2013.01); G06F 3/017 (2013.01); G06T 7/60 (2013.01); G06T 7/70 (2017.01); G06T 11/00 (2013.01); G06T 19/006 (2013.01)

(58) Field of Classification Search
CPC combination set(s) only.
See application file for complete search history.

(56) References Cited

U.S. PATENT DOCUMENTS

| | | | | |
|---|---|---|---|---|
| 2012/0280900 A1* | 11/2012 | Wang | ............... | G06F 3/0488 |
| | | | | 345/156 |
| 2016/0252607 A1* | 9/2016 | Saboo | ............... | G01S 13/02 |
| | | | | 342/107 |
| 2018/0011317 A1* | 1/2018 | Hasegawa | ........... | G06F 3/0481 |
| 2020/0064458 A1* | 2/2020 | Giusti | ............... | G01S 13/426 |
| 2020/0066236 A1* | 2/2020 | Giusti | ............... | G06V 10/143 |
| 2020/0275402 A1* | 8/2020 | Shi | ............... | H04W 76/11 |
| 2020/0356249 A1* | 11/2020 | Hunter | ............. | G06V 40/20 |
| 2021/0141076 A1 | 5/2021 | Ilic et al. | | |
| 2023/0376104 A1* | 11/2023 | Henty | ............... | H04N 21/47 |

FOREIGN PATENT DOCUMENTS

WO WO 2014/185808 A1 11/2014

OTHER PUBLICATIONS

Li, Zhengxiong et al., "WaveSpy: Remote and Through-wall Screen Attack via mm Wave Sensing," 2020 IEEE Symposium on Security and Privacy, May 18, 2020, pp. 217-232.

* cited by examiner

*Primary Examiner* — William Boddie
*Assistant Examiner* — Alecia D English
(74) *Attorney, Agent, or Firm* — McCarter & English, LLP

(57) ABSTRACT

An apparatus, method and computer program is described including: generating a display pattern including features with spatial variations, wherein the spatial variations are configured to enable determination, by a first radar device, of at least one of an orientation of a first user device, position of the first user device, size of a display of the first user device, or one or more gestures associated with the display.

16 Claims, 8 Drawing Sheets

DEVICE ORIENTATION DETECTION

FIELD

The present specification relates to detection of device features, such as orientation, position, size of a display, and gesture(s) associated with a display of the device.

BACKGROUND

Arrangements for determining feature of devices (such as orientation, position, size of a display, and gesture(s) associated with a display of the device) within line of sight are known. There remains a need for further development in this field.

SUMMARY

In a first aspect, this specification provides an apparatus comprising means for performing: generating a display pattern comprising features with spatial variations, wherein the spatial variations are configured to enable determination, by a first radar device, of at least one of: an orientation of a display of a user device, position of a display of the user device, size of a display of the user device, or one or more gestures associated with the user device.

In some examples, the display pattern is determined, based at least in part, on one or more parameters associated with the first radar device. For example, the parameters may be received at, or determined by the user device.

In some examples, determination of one or more gestures associated with the user device comprises determination of a change in at least one of the orientation of the user device or the position of the user device.

Some examples may include means for performing: displaying the display pattern on the display.

Some examples may include means for performing: determining one or more parameters associated with the first radar device; and adapting the display pattern based, at least in part, on the one or more parameters associated with the first radar device.

In some examples, the one or more parameters associated with the first radar device comprise at least one of: a localization accuracy metric or reflected spectrum data.

Some examples include means for performing: enabling gesture interaction with a second device in response to determination, based on the display pattern, by the first radar device that the display is oriented towards the second device.

In some examples, the display pattern comprises features that are configured to enable the first radar device to authenticate inertial measurement unit data associated with the user device, received at the first radar device.

In some examples, the display pattern comprises at least one of: one or more predetermined shapes displayed in a non-symmetrical manner; one or more predetermined shapes displayed with a predetermined spatial pattern; or transitioning between a plurality of predetermined patterns.

In some examples, the display pattern has at least one of a size or duration that is sufficient for detection by the first radar device.

In some examples, the display pattern is generated, based, at least in part, on the usage of the display by a user.

The means may comprise: at least one processor; and at least one memory including computer program code, the at least one memory and the computer program code configured, with the at least one processor, to cause the performance of the apparatus.

In a second aspect, this specification describes a method comprising: generating a display pattern comprising features with spatial variations, wherein the spatial variations are configured to enable determination, by a first radar device, of at least one of: an orientation of a display of a user device, position of a display of the user device, size of a display of the user device, or one or more gestures associated with the user device.

In some examples, the display pattern is determined, based at least in part, on one or more parameters associated with the first radar device. For example, the parameters may be received at, or determined by the user device.

In some examples, determination of one or more gestures associated with the user device comprises determination of a change in at least one of the orientation of the user device or the position of the user device.

Some examples may include displaying the display pattern on the display.

Some examples may include determining one or more parameters associated with the first radar device; and adapting the display pattern based, at least in part, on the one or more parameters associated with the first radar device.

In some examples, the one or more parameters associated with the first radar device comprise at least one of: a localization accuracy metric or reflected spectrum data.

Some examples include enabling gesture interaction with a second device in response to determination, based on the display pattern, by the first radar device that the display is oriented towards the second device.

In some examples, the display pattern comprises features that are configured to enable the first radar device to authenticate inertial measurement unit data associated with the user device, received at the first radar device.

In some examples, the display pattern comprises at least one of: one or more predetermined shapes displayed in a non-symmetrical manner; one or more predetermined shapes displayed with a predetermined spatial pattern; or transitioning between a plurality of predetermined patterns.

In some examples, the display pattern has at least one of a size or duration that is sufficient for detection by the first radar device.

In some examples, the display pattern is generated, based, at least in part, on the usage of the display by a user.

In a third aspect, this specification describes an apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: generating a display pattern comprising features with spatial variations, wherein the spatial variations are configured to enable determination, by a first radar device, of at least one of: an orientation of a display of a user device, position of a display of the user device, size of a display of the user device, or one or more gestures associated with the user device.

In a sixth aspect, this specification describes a computer-readable medium (such as a non-transitory computer-readable medium) comprising program instructions stored thereon for performing at least the following: generating a display pattern comprising features with spatial variations, wherein the spatial variations are configured to enable determination, by a first radar device, of at least one of: an orientation of a display of a user device, position of a display of the user device, size of a display of the user device, or one or more gestures associated with the user device.

In a seventh aspect, this specification describes an apparatus comprising: at least one processor; and at least one memory including computer program code which, when executed by the at least one processor, causes the apparatus to: generate a display pattern comprising features with spatial variations, wherein the spatial variations are configured to enable determination, by a first radar device, of at least one of: an orientation of a display of a user device, position of a display of the user device, size of a display of the user device, or one or more gestures associated with the user device.

In an eighth aspect, this specification describes an apparatus comprising: a first module configured to generate a display pattern comprising features with spatial variations, wherein the spatial variations are configured to enable determination, by a first radar device, of at least one of: an orientation of a display of a user device, position of a display of the user device, size of a display of the user device, or one or more gestures associated with the user device.

In a ninth aspect, this specification describes an apparatus comprising means for performing: detecting the display pattern displayed at the display of the first user device; and determining one at least one of an orientation of the first user device, a position of the first user device, size of the display of the first user device, or one or more gestures associated with the first user device based, at least in part, on the one or more display patterns.

In some examples, enabling gesture interaction between the first user device and one or more second devices in response to determining that the first user device is oriented towards the one or more second devices.

The means may comprise: at least one processor; and at least one memory including computer program code, the at least one memory and the computer program code configured, with the at least one processor, to cause the performance of the apparatus.

In a tenth aspect, this specification describes a method comprising: detecting the display pattern displayed at the display of the first user device; and determining one at least one of an orientation of the first user device, a position of the first user device, size of the display of the first user device, or one or more gestures associated with the first user device based, at least in part, on the one or more display patterns.

In some examples, enabling gesture interaction between the first user device and one or more second devices in response to determining that the first user device is oriented towards the one or more second devices.

In an eleventh aspect, this specification describes an apparatus configured to perform any method as described with reference to the tenth aspect.

In a twelfth aspect, this specification describes computer-readable instructions which, when executed by computing apparatus, cause the computing apparatus to perform any method as described with reference to the tenth aspect.

In a thirteenth aspect, this specification describes a computer program comprising instructions for causing an apparatus to perform at least the following: detecting the display pattern displayed at the display of the first user device; and determining one at least one of an orientation of the first user device, a position of the first user device, size of the display of the first user device, or one or more gestures associated with the first user device based, at least in part, on the one or more display patterns.

In a fourteenth aspect, this specification describes a computer-readable medium (such as a non-transitory computer-readable medium) comprising program instructions stored thereon for performing at least the following: detecting the display pattern displayed at the display of the first user device; and determining one at least one of an orientation of the first user device, a position of the first user device, size of the display of the first user device, or one or more gestures associated with the first user device based, at least in part, on the one or more display patterns.

In a fifteenth aspect, this specification describes an apparatus comprising: at least one processor; and at least one memory including computer program code which, when executed by the at least one processor, causes the apparatus to: detect the display pattern displayed at the display of the first user device; and determine one at least one of an orientation of the first user device, a position of the first user device, size of the display of the first user device, or one or more gestures associated with the first user device based, at least in part, on the one or more display patterns.

In a sixteenth aspect, this specification describes an apparatus comprising: a first module configured to detect the display pattern displayed at the display of the first user device, and a second module configured to determine one at least one of an orientation of the first user device, a position of the first user device, size of the display of the first user device, or one or more gestures associated with the first user device based, at least in part, on the one or more display patterns.

In a seventeenth aspect, this specification describes system comprising: a first user device and a first radar device, wherein: the first user device comprising means for performing: generating a display pattern comprising features with spatial variations, wherein the spatial variations are configured to enable determination, by the first radar device, of one or more of an orientation, position, size of a display of the first user device, and gesture(s) associated with the first user device; and the first radar device comprising means for performing: detecting the display pattern displayed at the display of the first user device; and determining one at least one of an orientation of the first user device, a position of the first user device, size of the display of the first user device, or one or more gestures associated with the first user device based, at least in part, on the one or more display patterns.

In some examples, the first radar device further comprises means for performing: enabling gesture interaction between the first user device and one or more second devices in response to determining that the first user device is oriented towards the one or more second devices.

In some examples, the first user device further comprises means for performing displaying the generated display pattern over a time period, such that the displayed display pattern is configured to enable the first radar device to determine at least one of: a change in position of the display over said time period, or a change in orientation of the display over said time period.

BRIEF DESCRIPTION OF THE DRAWINGS

Example embodiments will now be described, by way of example only, with reference to the following schematic drawings, in which.

DETAILED DESCRIPTION

Figure 1:
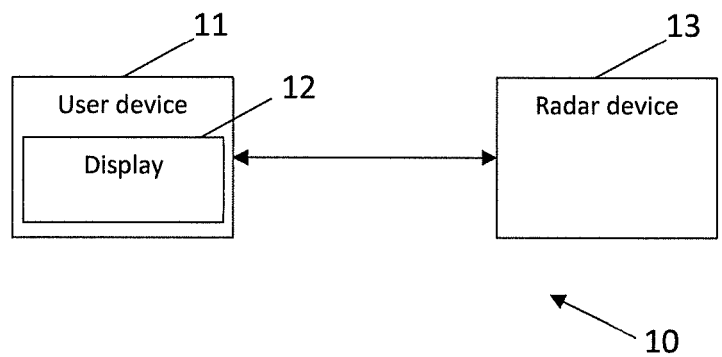
FIG. 1 is a block diagram of a system in accordance with an example embodiment.

The scope of protection sought for various embodiments of the invention is set out by the independent claims. The embodiments and features, if any, described in the specification that do not fall under the scope of the independent claims are to be interpreted as examples useful for understanding various embodiments of the invention.

In the description and drawings, like reference numerals refer to like elements throughout.

FIG. 1 is a block diagram of a system, indicated generally by the reference numeral 10, in accordance with an example embodiment. System 10 comprises a first user device 11, which first user device 11 comprises at least one display 12. System 10 further comprises a radar device 13. The radar device 13 may be a device with radar functionality (e.g. mmWave Frequency-modulated continuous-wave (FMCW) radar).

In some example embodiments, content of display screens, such as organic light emitting diode (OLED) screens or liquid crystal display (LCD) screens, may be inferred remotely (e.g. non-line of sight, such as through walls) by radar devices, such as mmWave FMCW radar devices. For example, liquid crystal nematic patterns may act as an array of antennas, which may manipulate the reflected mmWave signals. The dielectric constant of liquid crystals may change depending on their alignment, and therefore their manipulation of reflected mmWave signals may change. Further, a state vector machine and K-nearest neighbour classifier may initially be applied to identify screen content based on temporal features of the reflected signals. A deep neural network may then be used for distinguishing spectral features and predict content features with comparatively greater accuracy. However, resolution of such radar devices (e.g. dependent on radar aperture) may not be sufficient to resolve a shape or orientation of a display.

Example embodiments described below provide techniques for allowing radar devices to determine orientation and/or position of user devices.

Figure 2:
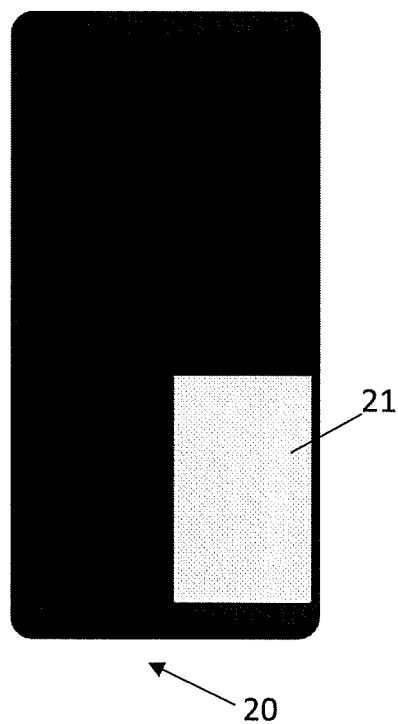
FIGS. 2 and 3 are illustrations of a user device in accordance with example embodiments.

FIG. 2 is an illustration of a user device, indicated generally by the reference numeral 20, in accordance with an example embodiment. The user device 20 may generate and display a display pattern, such as the display pattern 21. The display pattern 21 may comprise features with spatial variations. For example, the example display pattern 21 comprises pixels forming a white rectangle in the bottom right corner of the display of the user device 20, and the remaining portion of the display comprises black pixels. The display pattern 21 may therefore be an asymmetric pattern, such that spatial variations within the display pattern enables the display pattern to be detected by a radar device (such as the radar device 13) and enable an orientation or position of a display of the user device 20 to be determined by the radar device.

Figure 3:
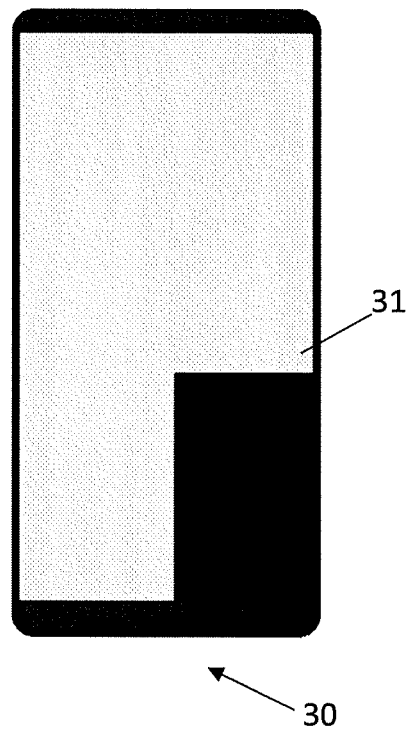

FIG. 3 is an illustration of a user device, indicated generally by the reference numeral 30, in accordance with an example embodiment. The user device 3o may generate and display a display pattern, such as the display pattern 31. The example display pattern 31 is an inverse of the display pattern 21 shown with reference to FIG. 2. For example, the display pattern 31 comprises pixels forming a black rectangle in the bottom right corner of the display of the user device 30, and the remaining portion of the display comprises white pixels. In one example embodiment, a display pattern (e.g. a temporal display pattern) on a user device may alternate between the display pattern 21 and display pattern 31 periodically (e.g. with a known frequency).

Figure 4:
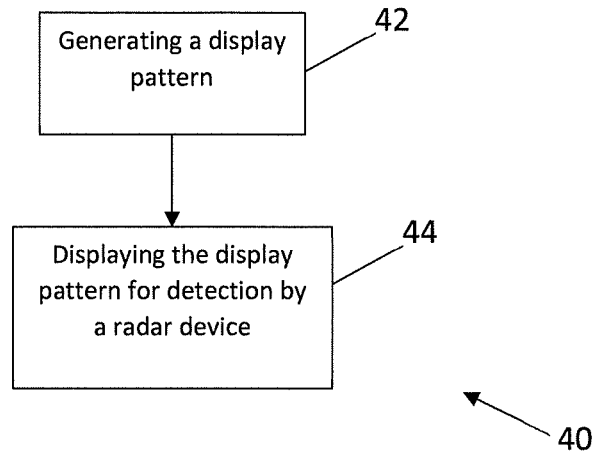
FIGS. 4 and 5 are flowcharts of algorithms in accordance with example embodiments.

FIG. 4 is a flowchart of an algorithm, indicated generally by the reference numeral 40, in accordance with an example embodiment. The algorithm 4o may be performed at a user device, such as the user device 11 described with reference to FIG. 1. At operation 42, a display pattern is generated, for example, at the user device (ii, 20, 30) having a display (e.g. LCD or OLED screen). The display pattern may be displayed at the display of the user device at operation 44. The display pattern (similar to display patterns 21 and/or 31) may comprise features with spatial variations, with the spatial variations being configured to enable determination, by one or more radar devices (e.g. radar device 13), of one or more of an orientation, position, and size of a display, and gesture(s) associated with the display of the user device. For example, determination of gesture(s) associated with the display may comprise determination of a series of changes in one or more of the orientation and position of the display of the user device.

In an example embodiment, generating the display pattern at operation 42 may be based on one or more rules and/or may be based on a machine learning algorithm. For example, the display pattern generated may be based on one or more parameters associated with the radar device (e.g. radar device 13), so as to ensure that the radar device is able to determine an orientation or position of the user device based on the display pattern.

In an example embodiment, the display pattern generated in the operation 42 may comprise one or more predetermined shapes (e.g. a rectangle of known ratio of width and length) displayed in a non-symmetrical manner. Alternatively, or in addition, the display pattern may comprise one or more predetermined shapes displayed with a predetermined spatial pattern. For example, a spatial pattern may be provided at at least a portion of the display, and one or more predetermined shapes (e.g. rectangle of known width and length, or the like) may be provided adjacent to, or overlapping, the spatial pattern.

Alternatively, or in addition, the display pattern may comprise spatial and temporal patterns, such that the display pattern comprises transitioning between a plurality of predetermined patterns, for example at a predetermined periodicity or frequency. In one example, the transitioning may comprise transitioning between a first display pattern (e.g. display pattern 21) and a second display pattern (e.g. display pattern 31), where the first and second display patterns may have high relative contrasts. For example, the first and second display patterns may be inverse patterns of each other. Transitioning between inverted states may provide a discernible response or high signal-to-noise ratio response for detection by the radar device. In another example, the transitioning may be from displaying a first display pattern periodically (e.g. in flashes) such that within intervals of displaying the first display pattern, no other display pattern is displayed. This may allow the radar device to perform a difference measurement (e.g. difference in display when the display pattern is displayed, and when the display pattern is not displayed), such that relevant spectral features of the display pattern may be determined.

In an example embodiment, the display pattern comprises a defined repeating spatial pattern (e.g., stripes with known spacing pattern) along a portion of the display. The display pattern may further comprise the repeating spatial pattern moving (e.g. gradually) in a predetermined direction, thus providing a spatial and temporal display pattern. The direction of movement may indicate a reference direction to the radar device.

In an example embodiment, the display pattern may comprise a grid of defined shapes on the display that may individually flash between a HIGH state (e.g. display pattern being displayed) and LOW state (e.g. display pattern not being displayed) at different intervals, thus encoding their position on the screen through their respective flash duty cycles or timings.

In an example embodiment, the display patterns may have a size that is sufficient for detection by radar devices (e.g. radar device 13). In one example embodiment, the minimal determinable length of a display pattern may be a dependent on the liquid crystal array dielectric constant (nominally 3.66), and the transmitted radar frequency (e.g. 30 GHz-300 GHz for mmWave radar). For example, within the mmWave band for the radar device, the minimum determinable length of display pattern features may range from 2.61 mm to 0.26 mm. In one example, increasing the size of display pattern (e.g. relative to the size of the display screen) may result in increases in the measured amplitude of the response by the radar device. In some examples, the increased amplitude may be useful, for example, if the display material reflection efficiency is relatively low (e.g. in some OLED display types), or if the expected distance and/or level of occlusion between the display and the external radar device(s) is large. In one example, the display pattern features may be of predetermined size (or moving at a defined distance over time across the display) allowing their perceived size (or movement) at a distance to be used by the radar device(s) to infer the distance to the display.

In an example embodiment, the display pattern has a duration (e.g. for spatial and temporal patterns) that is sufficient for detection by radar devices (e.g. radar device 13). For example, the display patterns may be displayed for a sufficient number of display refreshes and/or the refresh rate may be lowered so as to allow the display pattern to be displayed for a sufficient duration. In one example, a display refresh rate of 10 Hz to 25 Hz may be sufficient for readability of the display pattern by the radar device(s). In one example, the display refresh rate may be configured based on a polling rate of the radar device(s). In some example embodiments, when the display patterns comprise transitions (e.g. movements or intermittent flashing), the time period between flashes may be configured based on a preferred frequency (e.g. preferred by the relevant radar device(s)) of beacon updates such that the display pattern is discernible by the radar devices. The time period may be relatively low in order to allow the radar device(s) to detect the display pattern as a beacon for determining position and/or orientation of the user device. However, lowering the time period may cause power consumption to be higher. In some examples, the display refresh rate and/or time period between flashes may be dynamically adjusted based on the power level of the user device. For example, if the user device is sufficiently charged, and/or connected to a power supply (e.g. being charged), the time period may be configured to be relatively low (e.g. display refresh rate is high), and if the user device is at low power level (e.g. below 20%), the time period may considered to be relatively high (e.g. display refresh rate is low). In an example embodiment, the refresh rate may be updated dynamically using low-temperature polycrystalline oxide at a backplane of a display. The refresh rates may be updated based on one or more conditions, as described above.

In an example embodiment, the display pattern is generated, based, at least in part, on the usage of the display by a user. For example, the display patterns may be displayed in such a way that it is not noticeable or disruptive to the user's usage of the user device. For example, if the user is not engaged with a display (or a portion of the display) then display patterns may be displayed at any time. It may be determined that the user is not engaged with a display based on determining the device is display-side down on a surface, in a pocket. Alternatively, or in addition, the display pattern may be displayed on the currently unused edge of a curved-edge display, or on the temporarily hidden displays of a foldable or scrollable smartphone. Alternatively, it may be determined that the user is engaged with a display when, for example, a video content is being played at the display, or frequent user interaction (e.g. via touch inputs or voice inputs) is detected. In one example, if it is determined that the user is engaged with the display, the display pattern may be displayed (flashed) at a rate that is sufficiently high so as to be unnoticeable to the user. For example, if the minimum determinable length of display pattern features is sufficiently small, it may be possible to interlace the features at intervals in typical display content without impacting the viewing of the content.

In some example embodiments, the display pattern may be displayed continuously on the user device, for example when the user device is in sleep mode (e.g. user device having always-on capabilities). For example, liquid crystal states of LCD screens may be manipulated to portray display patterns while the display backlight is off, thereby not visually disturbing a user.

In an example embodiment, the display patterns may be embedded within display content of the screen, for example, with spatial variations that may not be noticeable to a user (e.g. unnoticeable to human eyes), while still being detectable by a radar device. For example, the display pattern may be a substantially transparent subtractive or additive mask on the display content.

Figure 5:
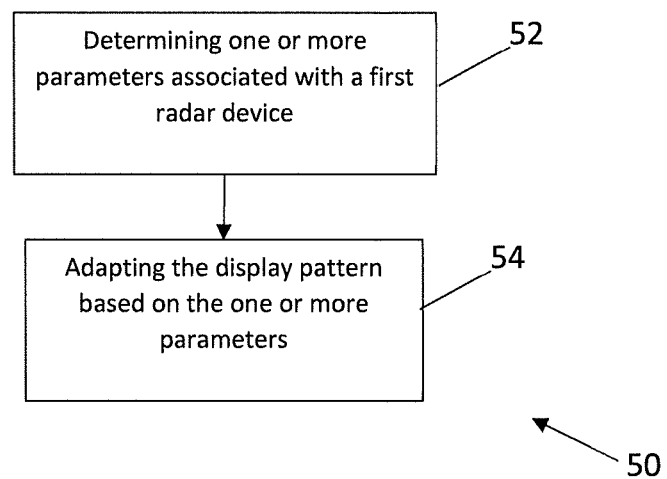

FIG. 5 is a flowchart of an algorithm, indicated generally by the reference numeral 50, in accordance with an example embodiment. The algorithm 50 may be performed at a user device, such as the user device 11. At operation 52, one or more parameters associated with a radar device, such as the radar device 13, may be determined (e.g. received from the radar device 13, or determined based on measurements or from information stored in the user device 11 relating to the radar device 13). Based on the determined one or more parameters, at operation 54, the display pattern (e.g. display pattern generated at operation 42 described with reference to FIG. 4) may be adapted. For example, the parameters may comprise a localization accuracy metric (e.g. capability of the radar device to determine orientation and/or position of the user device) and/or reflected spectrum data.

In an example embodiment, in the event that the user device, such as the user device 11, comprises radar capabilities (e.g. mmWave antenna) or a 5G antenna, the one or more parameters may be determined (e.g. measured) by the user device by using such radar capabilities. For example, the radar device may be identified based on their beam features, and the one or more parameters associated with the radar device may be determined based on a look-up database for the identified radar device. The one or more parameters that may be determined in such a way may comprise sampling rate of the radar device, and/or distance of the radar device from the user device (e.g. if nominal signal strength of the radar device is known).

In an example embodiment, a localization accuracy metric may be obtained from comparison between the mmWave localization measurement and that of a ground truth measurement, such as a LiDAR measurement, or a fiducial marker based measurement with an RGB camera (where LiDAR or camera positions are known relative to the radar equipped device).

In an example embodiment, generating and/or adapting a display pattern may comprise a calibration process comprising iterating display patterns one or more times to reach a sufficient localization accuracy by one or more radar devices. For example, repeated measurements of the localization accuracy metrics may be taken with differing distances between the user device and the radar device, different orientations of the user device, and/or different levels of occlusion between the radar device and the user device. This may enable generating an optimal display pattern. In some examples, user interface instructions may be provided at the user device to guide a user through the calibration process (e.g. requesting the user to move the user device through several locations, orientations, or other conditions). In one example, localization accuracy may be increased by increasing size of the display pattern features and/or lowering a refresh interval of the display pattern on the display screen.

In an example embodiment, in the event that multiple external radar devices are present within the vicinity of the user device, the user device may generate a display pattern based on capabilities of multiple available radar devices, such that a plurality of the radar devices are able to detect the display pattern and determine position and/or orientation of the user device based on the display pattern. For example, such a display pattern may be generated based on the parameters associated with a radar device with the lowest detection capabilities. In some examples, adapting the display pattern may comprise generating additional display pattern features that may ensure their sufficient discernibility, without reducing the discernibility of localization features (e.g. determination of position and/or orientation of the user device).

In an example embodiment, the display pattern, when displayed, may comprise pattern features that are suitable for conveying additional information, such as indicating their unique beacon ID. For example, the unique beacon ID may be indicated by temporal flashing of a static rectangle display pattern (e.g. display pattern 21 or 31). The flashing may be configured such that it does not interfere with the minimum display time required for the display pattern.

In some example embodiments, a radar device may not have a sufficient radar aperture to accurately determine a shape or size of a user device (e.g. finely resolve a target's shape) in a single measurement. However, changing scattering responses due to small motions measured rapidly over several instances, as well as machine learning based post-processing, may allow for accurate motion detection. Performing localization measurements based on the display patterns, as described above, may allow accurately resolving the range and angle of scattering surfaces. In one example, for radars with a relatively large aperture, beam steering may be used to resolve the shape of objects.

Figure 6:
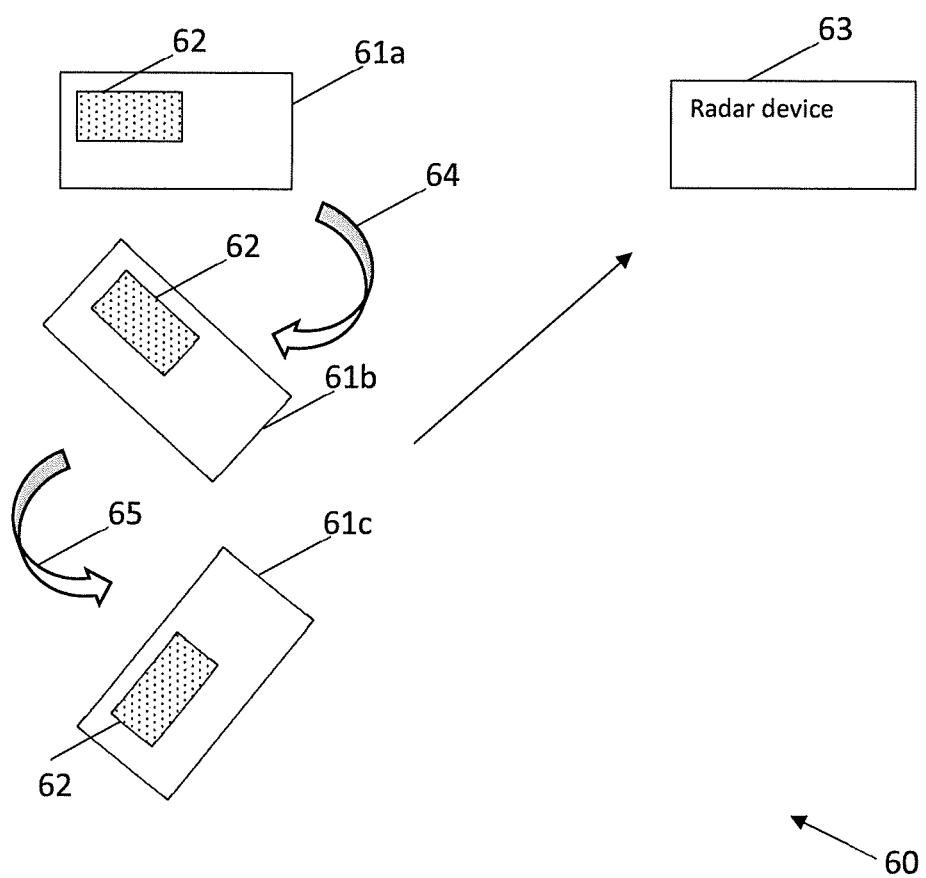
FIGS. 6 and 7 are block diagrams of systems in accordance with example embodiments.

FIG. 6 is a block diagram of a system, indicated generally by the reference numeral 6o, in accordance with an example embodiment. The system 6o comprises a user device 61 and a radar device 63. The user device 61 is shown in a plurality of orientations 61a, 61b, and 61c. The user device 61 therefore undergoes a series of changes in orientation (e.g. changing from orientation 61a to 61b as shown by arrow 64, and changing from orientation 61b to 61c as shown by arrow 65).

In an example embodiment, determination of gesture(s) associated with the user device comprises determination of a change (e.g. series of changes) in one or more of the orientation and position of the user device. For example, the radar device 63 may determine a gesture made by a user by moving the user device 61 from orientation 61a to 61b to 61c, where the series of changes in orientation is determined based on the display pattern 62 displayed at the user device. For example, as the user device 61 is moved, the display pattern 62 may move accordingly, and the movement (e.g. change in orientation) may be detected by the radar device 63 to determine a gesture associated with the user device 61.

In an example embodiment, the user device 61 may display the display pattern 62 over a time period (e.g. a predetermined time period), such that the display pattern 62 may enable the radar device 63 to determine a change in position and/or orientation of the user device 61 over said time period. For example, the time period may be sufficient to enable a user to perform a gesture comprising the movements shown by the arrows 64 and 65.

In an example embodiment, the display pattern 62 may be displayed on the user device 61 continuously to enable the radar device 62 to continuously localize (e.g. determine position and/or orientation of) the user device 61, and thus enable activities of a user of the user device 61. For example, if a user of the user device 61 (e.g. a smartphone, smart watch, or the like) is doing a physical activity (e.g. exercise, etc.), while carrying and/or wearing the user device 61, the movement of the user may be inferred from the movement of the user device 61 based on the series of changes in position and/or orientation of the user device 61 detected from the display pattern 62. Repeated localization measurements may be used for determining the motion and orientation change of the user device over time. In one example, current and/or projected activity of the user may be determined based on the change in position and/or orientation of the user device 61 based on a machine learning model. In one example embodiment, the radar device 63 may be part of a vehicle (e.g. an autonomous vehicle), and may be able to detect display patterns generated and displayed at the user device 61 that may be carried and/or worn by a pedestrian or cyclist, and consequently determine predicted movement (e.g. change in orientation and/or position) of the user device 61, and also the user of the user device 61. The prediction may further be based on a machine learning algorithm. For example, based on the predicted movement, the vehicle may slow down in response to determining that the pedestrian or cyclist may pass in front of the vehicle.

Figure 7:
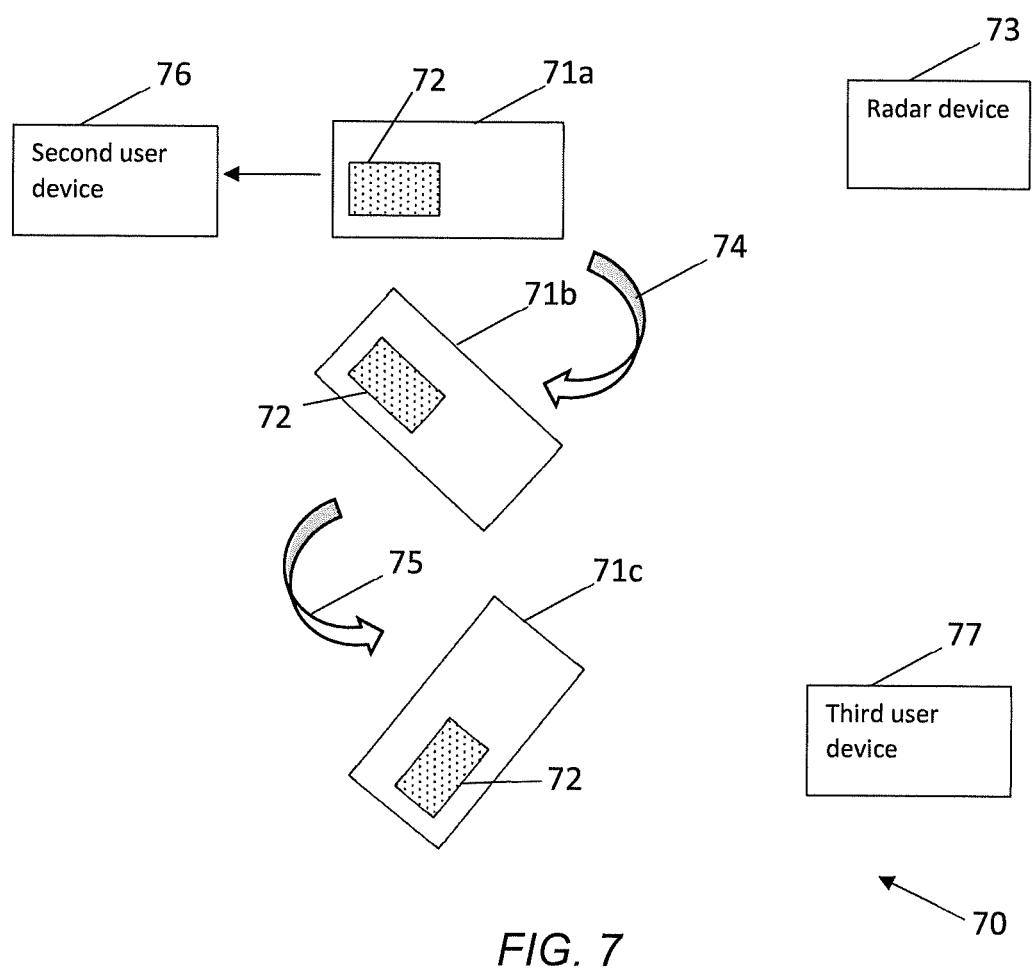

FIG. 7 is a block diagram of a system, indicated generally by the reference numeral 70, in accordance with an example embodiment. The system 70 comprises a first user device 71 and a radar device 73. The first user device 71 is shown in a plurality of orientations via, 71b, and 71c. The user device 71 therefore may undergo a series of changes in orientation (e.g. changing from orientation 71a to 71b as shown by arrow 74, and changing from orientation 71b to 71c as shown by arrow 75). The first user device 71 may display a display pattern 72 (e.g. with spatial variations). The system 70 further comprises a second user device 76 and a third user device 77. The second and third user devices 76 and 77 may be IoT (Internet of Things) devices that the first user device 71 may interact with. For example, the first user device 71 may be a smartphone or smartwatch, the second user device 76 may be a home appliance such as a smart TV, and the third user device 77 may be another home appliance such as a smart refrigerator.

In an example embodiment, gesture interaction may be enabled between the first user device 71 and one or more of the second device 76 and third device 77. The gesture interaction may be enabled in response to determining, for example by the radar device 73, that the first user device 71 is oriented towards one of the second user device 76 and third user device 77.

For example, in system 70, the first user device 71 is oriented towards the second user device 76. The radar device 73 may detect that the first user device 71 is oriented towards the second user device 76 (rather than the third user device 77) based on detection of the display pattern 72. The display pattern 72 may cause a characteristic response due to being oriented at the second user device 76 (e.g. observing IoT device), allowing the first user device 71 to direct gestures (e.g. such as a gesture comprising changes in orientation 71*a* to 71*b* shown by the arrow 74 and 71*b* to 71*c* shown by the arrow 75) specifically towards the second user device 76.

In some example embodiments, a radar device may be part of a user device, such as the second user device 76 and/or the third user device 77. For example, the second user device 76 may have radar capabilities, such that the second user device 76 may itself detect the display pattern 72 and determine that the first user device 71 is oriented towards the second user device 76.

In an example embodiment, a plurality of radar devices and/or a plurality of user devices having radar capabilities may perform localization (e.g. determine orientation and/or position) of the first user device 71 based on the display pattern 72, and may communicate the localization measurements to each other and/or to a central system (e.g. a server). The intended recipient of a gesture interaction performed with the first user device 71 may then be determined based on the localization measurements of the plurality of devices performing the localization. The observed localization measurements may be used for synchronizing a gesture interaction between the first user device 71 and the intended user device, such as the second user device 76.

Figure 8:
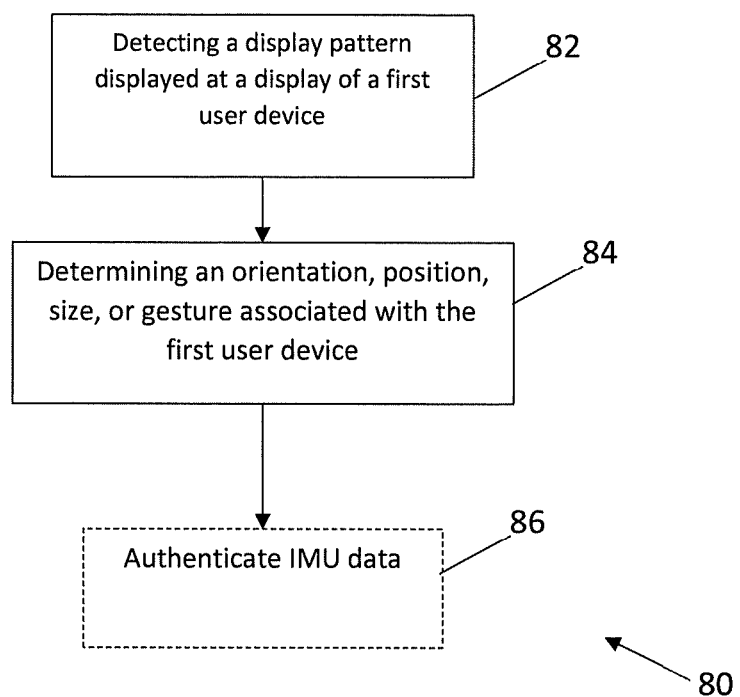
FIG. 8 is a flowchart of an algorithm in accordance with an example embodiment.

FIG. 8 is a flowchart of an algorithm, indicated generally by the reference numeral 80, in accordance with an example embodiment. The algorithm 80 may be performed at a radar device (e.g. radar device 13, 63, 73) or a user device (e.g. IoT device) with radar capabilities.

At operation 82, a display pattern (e.g. display pattern 21, 31, 62, 72) displayed at a display of a first user device (e.g. user device 11, 61, 71) may be detected using radar capabilities (e.g. mmWave FMCW radar).

Next, at operation 84, based on the detected display pattern, an orientation, position, size, and/or gesture associated with the first user device may be determined. For example, the determination may be based on a rule or a machine learning model, as discussed above with reference to FIG. 2. As discussed above, various operations, such as determination of a gesture interaction, and/or detection of an intendent recipient of a gesture interaction, may be performed based on the determination of the orientation or position of the first user device.

Next, at an optional operation 86, an inertial measurement unit (IMU) data associated with the first user device may be authenticated based on the display pattern. The operation 86 may be performed at the radar device, or may be performed at an external system or module (e.g. server) that receives information of the display pattern from the radar device.

In an example embodiment, IMU packets that appear to be generated from the first user device may be authenticated based on determination of the display pattern displayed at the first user device. In some scenarios, IMU packets may be spoofed such that malicious IMU packets may be generated and may appear to be generated from the first user device. The radar device may observe and track gesture(s) made with the first user device, and compare the gesture(s) to the IMU packets. The display pattern may comprise additional features that may allow authentication of IMU packets that appear to be generated from the first user device. For example, additional session specific pattern features (such as a specific temporal flashing sequence), and device specific response features in the display pattern may provide additional layers of authenticity to the gesture(s) observed by the radar device. If IMU packets are determined to not sufficiently correspond to localization measurements by the radar device, the IMU packets may be considered to lack authenticity. In one example, authentication of IMU data may be used for authenticating a signature gesture made with the first user device for authorizing a transaction.

Figure 9:
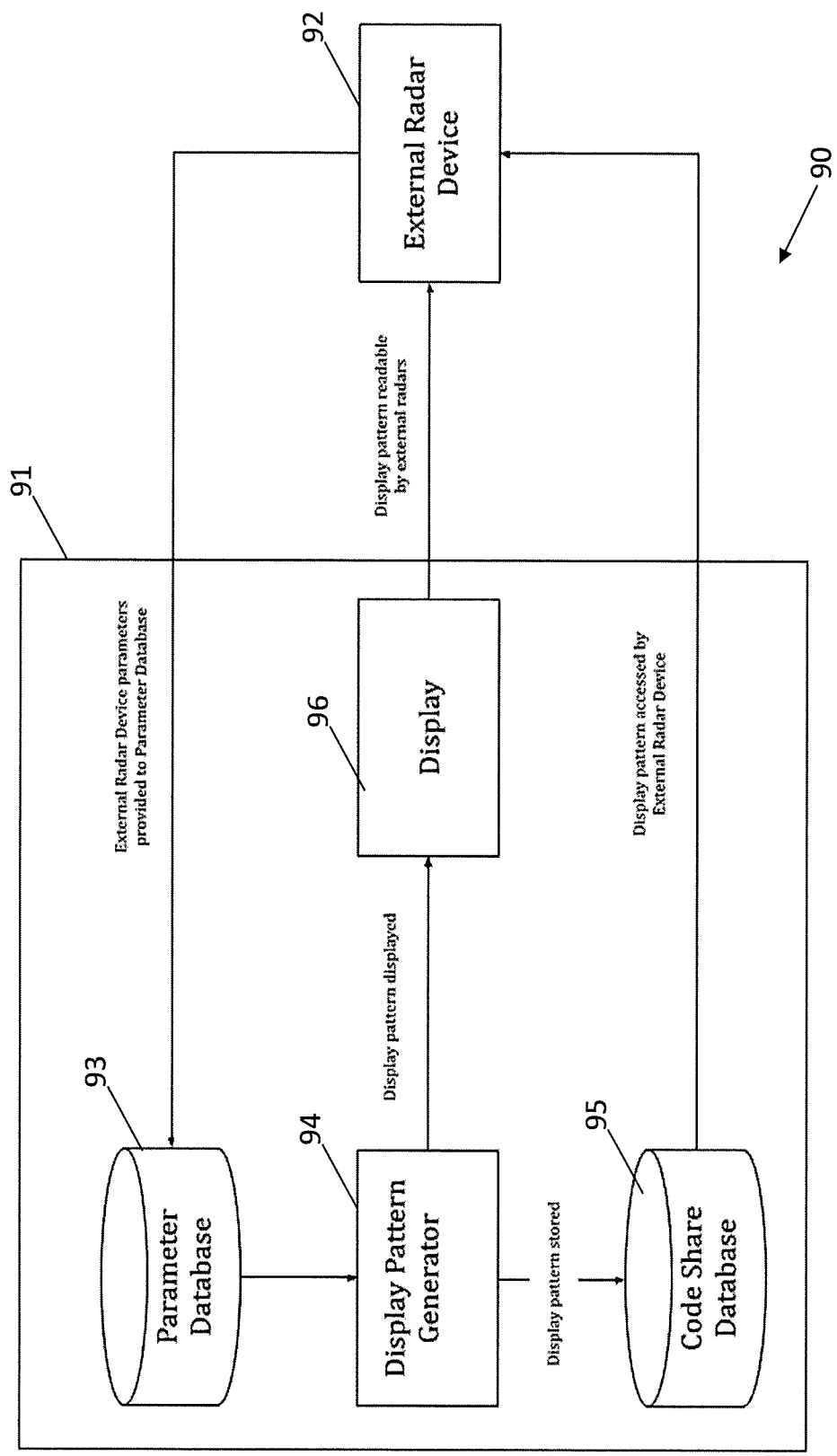
FIG. 9 is a block diagram of a system in accordance with an example embodiment.

FIG. 9 is a block diagram of a system, indicated generally by a reference numeral 90, in accordance with an example embodiment. The system 90 comprises a first user device 91 and an external radar device 92. The first user device 91 may be a smart device, such as a smartphone, tablet, smartwatch, or the like. The first user device 91 may comprise at least one display 96, such as an OLED or LCD screen that may be a controllable display. The first user device 91 may further comprise a parameter database 93, a display pattern generating module 94, and a code share database 95.

In one example embodiment, the parameter database 93 may store relevant hardware and capability information about the display 96 and/or any external radar devices 92. The parameter database 93 may further store transient information (e.g., the required frequency of beacon updates).

In one example embodiment, the display pattern generator module 94 may generate the display pattern to enable the radar device 92 to perform localization measurements of the first user device 91. The display pattern may be generated based, at least partially, on parameters stored in the parameter database 93 (e.g. transient information or parameters associated with the display 96 and/or radar device 92).

In one example embodiment, the code share database 95 may be within the first user device 91, or may be external to the first user device 91. In some examples, the code share database 95 may be accessed by the first user device 91 as well as external devices, such as the radar device 92, for sharing display patterns.

In one example embodiment, the radar device 92 may be equipped with FMCW mmWave (30 GHz-300 GHz) radar. The radar device 92 may provide parameters to the first user device 91 for generation of display pattern(s). The radar device 92 may further access display patterns, and may perform localization measurements (e.g. determining orientation and/or position) of the first user device 91 based on detected display patterns.

Figure 10:
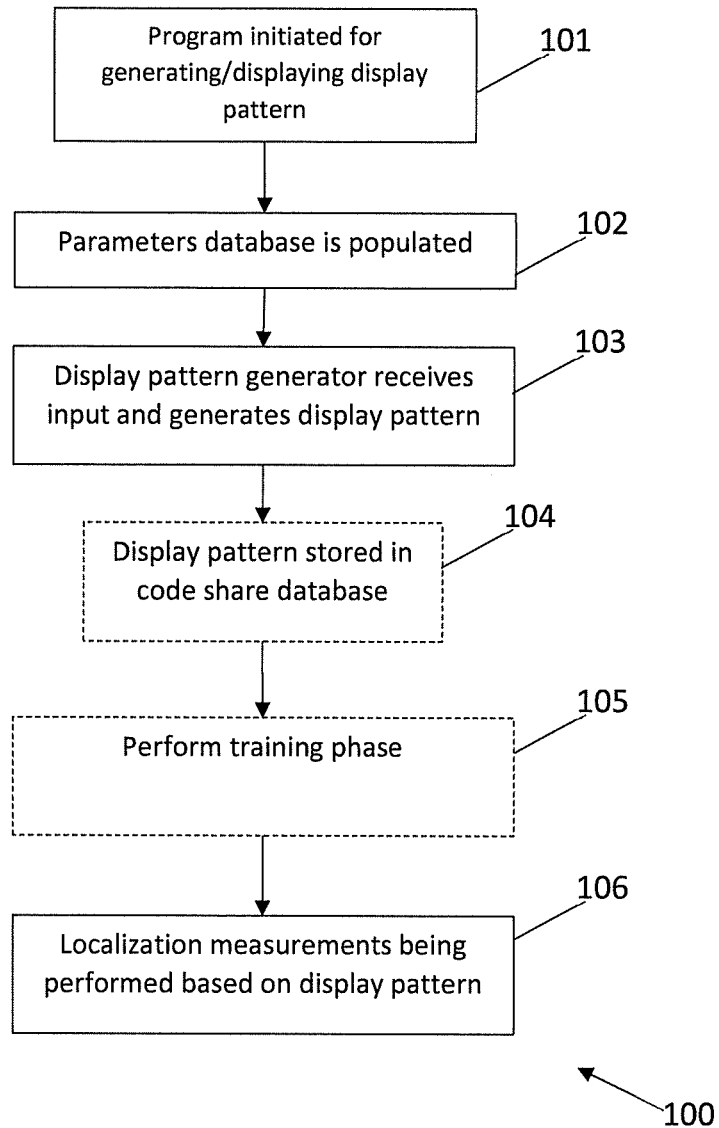
FIG. 10 is a flowchart of an algorithm in accordance with an example embodiment.

FIG. 10 is a flowchart of an algorithm, indicated generally by the reference numeral 100, in accordance with an example embodiment. FIG. 10 may be viewed in conjunction with FIG. 9 for better understanding.

The algorithm 100 starts with operation 101, where a user of the first user device 91 may initiate a program on the first user device 91, which program may initiate generation and/or display of a display pattern that is detectable by a radar device, such as the radar device 92.

Next, at operation 102, the parameters database 93 may be populated with relevant information, for example, comprising information regarding the display 96, radar device 92, and/or transient information (e.g., the required frequency of beacon updates).

At operation 103, the display pattern generator module 94 may receive an input from the parameter database 93, the input comprising at least some information stored in the parameter database 93. Based on the received input, the display pattern generator module 94 may generate and display a display pattern on the display 96. The display pattern may comprise features having spatial variations that may allow orientation and/or position of the first user device 91 to be determined by the radar device 92. The display pattern may be of sufficient size and/or duration so as to enable the radar device 92 to accurately perform localization measurements (e.g. determine position, orientation, size, and/or gestures associated with the first user device 91).

At operation 104, the display pattern may be stored in the code share database 95. The radar device 92 may be able to access the stored display pattern from the code share database. Operation 104 may be optional.

At operation 105, a training phase of a model (e.g. a machine learning model) may be performed, for example, jointly by the first user device 91 and the radar device 92. The training phase may comprise moving the first user device 91 through a plurality of known positions and orientations. The known positions and orientations are recorded, and may be associated with a set of recorded mmWave radar responses. The recorded mmWave radar responses may be initially processed as a series of spectrograms. The trained model may then be associated with the display pattern.

In an example embodiment, in the event that the model has already been trained (e.g. such that the radar device 92 has already been trained to recognize display patterns from the first user device 91), the operation 105 may be omitted. The radar device 92 may then only access the display pattern from the code share database 95 without having to perform the training phase.

At operation 106, the radar device 92 may perform localization measurements based on the display pattern displayed on the first user device 91. The localization measurements may be performed continuously for detecting gestures performed with the first user device. The radar device 92 may use the trained model to determine the orientation and/or position of the first user device 91, and may further use the trained model to determine gestures performed (e.g. by a user) with the first user device 91.

Figure 11:
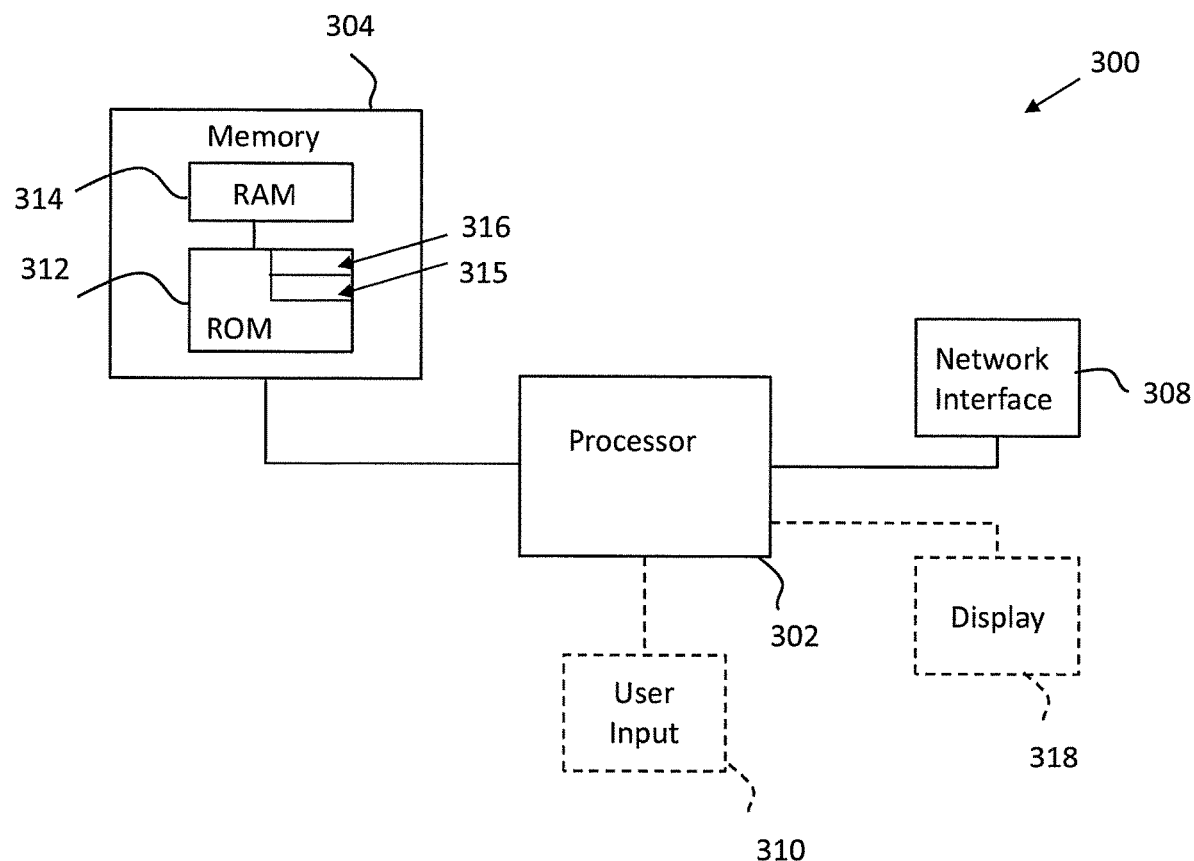
FIG. 11 is a block diagram of components of a system in accordance with an example embodiment.

For completeness, FIG. 11 is a schematic diagram of components of one or more of the example embodiments described previously, which hereafter are referred to generically as processing systems 300. A processing system 300 may have a processor 302, a memory 304 closely coupled to the processor and comprised of a RAM 314 and ROM 312, and, optionally, user input 310 and a display 318. The processing system 300 may comprise one or more network/apparatus interfaces 308 for connection to a network/apparatus, e.g. a modem which may be wired or wireless. Interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid-state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain computer program code which, when executed by the processor implements aspects of the algorithms 40, 50, 80, and 100, described above. Note that in the case of small device/apparatus the memory can be most suitable for small size usage i.e. not always hard disk drive (HDD) or solid-state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size In some example embodiments, the processing system 300 may also be associated with external software applications. These may be applications stored on a remote server device/apparatus and may run partly or exclusively on the remote server device/apparatus. These applications may be termed cloud-hosted applications. The processing system 300 may be in communication with the remote server device/apparatus in order to utilize the software application stored there.

Figure 12:
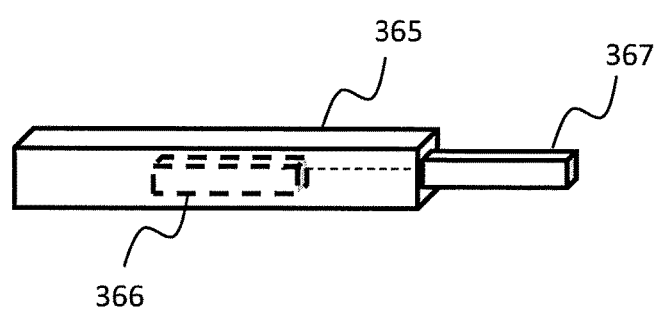
FIG. 12 shows an example of tangible media for storing computer-readable code which when run by a computer may perform methods according to example embodiments described above.

FIG. 12 shows tangible media, specifically a removable memory unit 365, storing computer-readable code which when run by a computer may perform methods according to example embodiments described above. The removable memory unit 365 may be a memory stick, e.g. a USB memory stick, having internal memory 366 for storing the computer-readable code. The internal memory 366 may be accessed by a computer system via a connector 367. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow charts of FIGS. 4, 5, 8, and 10, are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. An apparatus, comprising:
   at least one processor; and
   at least one memory storing instructions that, when executed with the at least one processor, cause the apparatus to perform:
      generating a display pattern comprising features with spatial variations that vary temporally, wherein the spatial variations are configured to enable detection of, with a millimeter wave frequency-modulated continuous-wave radar device, movement of a display pattern feature to determine at least one of: an orientation of a display of a user device, position of a display of the user device, size of a display of the user device, or one or more gestures associated with the user device.

2. An apparatus as claimed in claim 1, wherein the instructions, when executed with the at least one processor, cause the apparatus to perform determining the display pattern, based at least in part, on one or more parameters associated with the radar device.

3. An apparatus as claimed in claim 1, wherein the instructions, when executed with the at least one processor, cause the apparatus to perform determining a change in at least one of the orientation of the user device or the position of the user device.

4. An apparatus as claimed in claim 1, wherein the instructions, when executed with the at least one processor, cause the apparatus to perform:
   displaying the display pattern on the display.

5. An apparatus as claimed in claim 1, wherein the instructions, when executed with the at least one processor, cause the apparatus to perform: determining one or more parameters associated with the radar device; and adapting the display pattern based, at least in part, on the one or more parameters associated with the radar device.

6. An apparatus as claimed in claim 5, wherein the one or more parameters associated with the radar device comprise at least one of: a localization accuracy metric or reflected spectrum data.

7. An apparatus as claimed in claim 1, wherein the instructions, when executed with the at least one processor, cause the apparatus to perform: enabling gesture interaction with a second device in response to determining, based on the display pattern, with the radar device, that the display is oriented towards the second device.

8. An apparatus as claimed in claim 1, wherein the display pattern comprises features that are configured to enable the radar device to authenticate inertial measurement unit data associated with the user device, received at the radar device.

9. An apparatus as claimed in claim 1, wherein the display pattern comprises at least one of:
   one or more predetermined shapes displayed in a non-symmetrical manner;
   one or more predetermined shapes displayed with a predetermined spatial pattern; or
   a transition between a plurality of predetermined patterns.

10. An apparatus as claimed in claim 1, wherein the display pattern has at least one of a size or duration that is sufficient for detection with the radar device.

11. An apparatus as claimed in claim 1, wherein the instructions, when executed with the at least one processor, cause the apparatus to generate the display pattern based, at least in part, on the usage of the display with a user.

12. A system, comprising:
   a first user device and a millimeter wave frequency-modulated continuous-wave radar device,
   wherein the first user device comprises:
      at least one first processor; and
      at least one first non-transitory memory storing first instructions that, when executed with the at least one first processor, cause the system to perform:
         generating a display pattern comprising features with spatial variations that vary temporally, wherein the spatial variations are configured to enable detection of, with the radar device, movement of a display pattern feature to determine one or more of an orientation, position, size of a display of the first user device, or gesture(s) associated with the first user device; and
   wherein the radar device comprises:
      at least one second processor; and
      at least one second non-transitory memory storing second instructions that, when executed with the at least one second processor, cause the system to perform:
         detecting the display pattern displayed at the display of the first user device; and
         determining at least one of an orientation of the first user device, a position of the first user device, size of the display of the first user device, or one or more gestures associated with the first user device based, at least in part, on the one or more display patterns.

13. A system as claimed in claim 12, wherein the second instructions, when executed with the at least one second processor, cause the radar device to perform enabling gesture interaction between the first user device and one or more second devices in response to determining that the first user device is oriented towards the one or more second devices.

14. A system as claimed in claim 12, wherein the first instructions, when executed with the at least one first processor, cause the first user device to perform displaying the generated display pattern over a time period, and using the displayed display pattern to enable the radar device to determine at least one of: a change in position of the display over said time period, or a change in orientation of the display over said time period.

15. A method, comprising:
generating a display pattern comprising features with spatial variations that vary temporally, wherein the spatial variations are configured to enable detection of, with a millimeter wave frequency-modulated continuous-wave radar device, movement of a display pattern feature to determine at least one of an orientation of a first user device, position of the first user device, size of a display of the first user device, or one or more gestures associated with the display.

16. A non-transitory program storage device readable with an apparatus tangibly embodying a program of instructions executable with the apparatus for performing the method of claim 15.

* * * * *